United States Patent
Yan et al.

(10) Patent No.: US 12,052,102 B2
(45) Date of Patent: Jul. 30, 2024

(54) METHOD AND APPARATUS FOR SCHEDULING TRANSPORT BLOCKS

(71) Applicant: LENOVO (BEIJING) LIMITED, Beijing (CN)

(72) Inventors: Zhi Yan, Beijing (CN); Hongmei Liu, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 695 days.

(21) Appl. No.: 17/267,345

(22) PCT Filed: Aug. 10, 2018

(86) PCT No.: PCT/CN2018/099979
§ 371 (c)(1),
(2) Date: Feb. 9, 2021

(87) PCT Pub. No.: WO2020/029253
PCT Pub. Date: Feb. 13, 2020

(65) Prior Publication Data
US 2021/0266106 A1    Aug. 26, 2021

(51) Int. Cl.
*H04L 1/1607*  (2023.01)
*H04L 1/1812*  (2023.01)
*H04L 1/1822*  (2023.01)
*H04L 1/1867*  (2023.01)
*H04W 72/23*  (2023.01)

(52) U.S. Cl.
CPC .......... *H04L 1/1671* (2013.01); *H04L 1/1812* (2013.01); *H04W 72/23* (2023.01)

(58) Field of Classification Search
CPC ... H04L 1/1671; H04L 1/1812; H04L 1/1867; H04L 1/1819; H04L 1/1822; H04L 1/1896; H04W 72/23
USPC ........................................................ 370/329
See application file for complete search history.

(56) References Cited

U.S. PATENT DOCUMENTS

| | | |
|---|---|---|
| 2011/0194499 A1 | 8/2011 | Aiba et al. |
| 2011/0292894 A1* | 12/2011 | Wu ........................ H04L 1/1812 370/310 |
| 2012/0176957 A1 | 7/2012 | Chen et al. |
| 2013/0021988 A1 | 1/2013 | Chen |
| 2017/0078976 A1* | 3/2017 | Seo ........................ H04W 52/146 |
| 2020/0037314 A1* | 1/2020 | Xiong ........................ H04L 1/08 |

(Continued)

OTHER PUBLICATIONS

3GPP TS 36.321 V13.9.0 (Jul. 2018) (Year: 2018).*

(Continued)

*Primary Examiner* — Inder P Mehra
(74) *Attorney, Agent, or Firm* — Kunzler Bean & Adamson

(57) ABSTRACT

Method and apparatus for data transmission are disclosed. One method of a network equipment includes transmitting a control signal for scheduling at least one transport blocks, wherein the control signal includes a field for a number of scheduled transport blocks, and further includes at least one of following fields, a first field for NDI, a second field for RV, a third field for HARQ process ID, a fourth field; wherein, the fourth field includes information indicating at least one of followings: the NDI, the RV and the HARQ process ID for at least one of the scheduled transport blocks.

20 Claims, 4 Drawing Sheets

(56) References Cited

U.S. PATENT DOCUMENTS

2020/0145964 A1* 5/2020 Sengupta .............. H04L 1/0031

OTHER PUBLICATIONS

Huawei, Hisilicon, PHY signaling design for eLAA, 3GPP TSG RAN WG1 Meeting #85, R1-164829, May 23-27, 2016, pp. 1-5, Nanjing, China.
Intel Corporation, Remaining details of HARQ-ACK bundling, 3GPP TSG RAN WG1 Meeting #88, R1-1702152, Feb. 13-17, 2017, pp. 1-8, Athens, Greece.
3GPP, 3rd Generation Partnership Project; Technical Specification Group Radio Access Network; Evloved Universal Terrestrial Radio Access(E-UTRA) 3GPP TS 36.321 Jul. 2018, pp. 1-93.
International Searching Authority, "Notification of Transmittal of the International Search Report and the Written Opinion of the International Searching Authority, or the Declaration", PCT/IB2018/099979, Aug. 10, 2018, pp. 1-6.

* cited by examiner

METHOD AND APPARATUS FOR SCHEDULING TRANSPORT BLOCKS

FIELD

The subject matter disclosed herein relates generally to wireless communication and more particularly relates to scheduling transport block(s).

BACKGROUND

The following abbreviations and acronyms are herewith defined, at least some of which are referred to within the following description.

Third Generation Partnership Project ("3GPP"), Cyclic redundancy check ("CRC"), Downlink Control Information ("DCI"), Downlink ("DL"), Downlink Pilot Time Slot ("DwPTS"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Information Element ("IE"), Long Term Evolution ("LTE"), LTE Advanced ("LTE-A"), Media Access Control ("MAC"), Master Information Block ("MIB"), Machine Type Communication ("MTC"), MTC physical downlink control channel ("MPDCCH"), Narrow Band Internet of Things ("NB-IoT"), Narrow Band-Physical Uplink Control Channel ("NPDCCH"), New Radio ("NR"), Physical control format indicator channel ("PCFICH"), Physical Downlink Shared Channel ("PDSCH"), Physical hybrid ARQ indicator channel ("PHICH"), Physical Uplink Control Channel ("PUCCH"), Physical Uplink Shared Channel ("PUSCH"), Quadrature Phase Shift Keyin ("QPSK"), Quadrature amplitude modulation ("QAM"), Radio Resource Control ("RRC"), Received Signal Strength Indicator ("RSSI"), Reference Signal Received Power ("RSRP"), Reference Signal Received Quality ("RSRQ"), Receive ("RX"), Radio Network Temporary Identifier ("RNTI"), Redundancy Version ("RV"), Single Cell Point to Multipoint System ("SC-PTM"), Information Block ("SIB"), Transport Block ("TB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS").

MTC is expected to play an essential role within future 5G systems. It has been identified as an important use case for 5G NR wireless technology. Applications of this type are characterized by huge volumes of end-points and connections, using low-cost devices and modules for wireless sensor networks, connected home, smart metering and so on. It is expected that a new network is able to handle significantly more connections efficiently, which is prompting the development of new technologies to support Bandwidth Reduced Low Complexity/Coverage Enhancement (BL/CE) UEs.

NB-IoT is a standards-based low power wide area (LPWA) technology developed to enable a wide range of new IoT devices and services. NB-IoT significantly improves the power consumption of user devices, system capacity and spectrum efficiency. More than 10 years of battery life can be supported for a wide range of use cases.

Similar with a mechanism for scheduling a transport block in LTE, special DCI formats are used to schedule a DL/UL transport block for enhanced MTC (eMTC)/NB-IoT UEs. For example, DCI formats 6-0A and 6-0B are used to indicate UL grant for eMTC coverage enhancement (CE) mode A and CE mode B UE respectively, and DCI format 6-1A and 6-1B are used to indicate transmission configuration/scheduling of DL transport blocks. In another example, DCI format N0 is used to indicate UL grant for NB-IoT UE, and DCI format N1 is used to indicate the transmission configuration/scheduling of DL transport blocks.

Particularly, in the RAN80 plenary meeting of 3GPP, new work items for Rel.16 eMTC/NBIoT are approved. One of the objectives is to specify scheduling multiple DL/UL transport blocks with DCI for SC-PTM and unicast transmissions, with respect to machine-type communications for BL/CE UEs and narrowband UEs.

BRIEF SUMMARY

Scheduling multiple DL/UL transport blocks via multiple DCIs not only requires physical resources for transmitting the multiple DCIs, but also increases the burden for UE to monitor and detect the DCIs. To solve this problem, the disclosures herein are aimed at scheduling multiple DL/UL transport blocks by one DCI. In another aspect, the size of DCI should be controlled in an efficient way to further save physical resources.

The method and apparatus for scheduling multiple transport blocks are disclosed. One method proposed for network equipment to transmit a control signal for scheduling at least one transport block, wherein the control signal includes a field for a number of scheduled transport blocks and further includes at least one of following fields: a first field for new data indication (NDI), a second field for redundancy version (RV), a third field for Hybrid Automatic Repeat Request (HARQ) process identifier (ID) and a fourth field; wherein, the fourth field includes information indicating at least one of followings: the NDI, the HARQ process ID, and the RV for at least one of the scheduled transport blocks.

Further, the information included in the fourth field is determined according to the number of scheduled transport blocks.

Further, a number of bits for at least one of the first field for NDI, the second field for RV and a third field for HARQ process ID is determined according to the number of scheduled transport blocks.

The method and apparatus disclosed herein not only provides a mechanism for scheduling multiple transport blocks in one DCI, but also control the size of the DCI in an efficient way. Thus, the method and apparatus disclosed herein contributes to increasing spectrum utilization and data throughput.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore considered to be limiting in scope, the embodiments will be described and explained with additional specificity and detail through the use of the accompanying drawings, in which.

DETAILED DESCRIPTION

Figure 1:
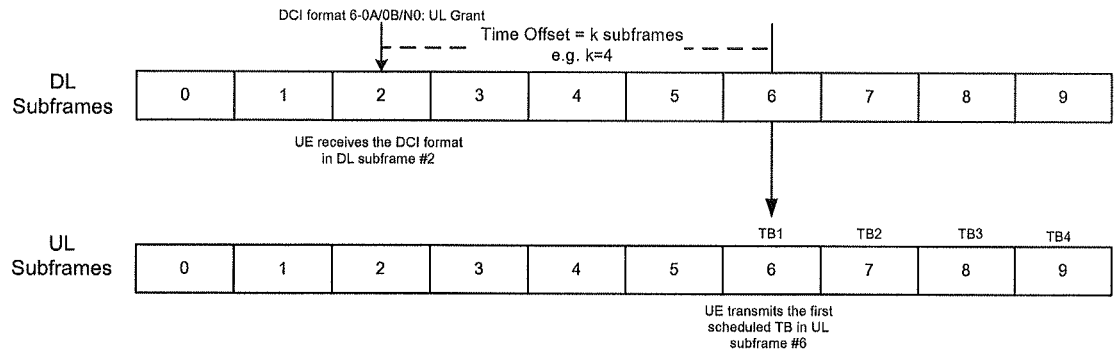
FIG. 1 is a schematic diagram illustrating scheduling transport blocks with DCI.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electro-magnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

The reason for scheduling multiple transport blocks with one DCI is that MTC/NB-IoT UE(s) are usually static and do not have mobility, which implies channel quality may not change for such UE(s) over time. Enhancements to a mechanism for scheduling multiple transport blocks with one DCI should be studied to save physical resource for transmitting the DCI and reduce burden for UE to monitor and detect the DCI. The mechanism disclosed herein contributes to reducing the MPDCCH/NPDCCH scheduling overhead, as well as increasing spectrum utilization, data throughput and transmission efficiency.

It should be understood that, given that the DCI can indicate UL grant for UE—for example, DCI format 6-0A for eMTC CE mode A, DCI format 6-0B for eMTC CE mode B, or DCI format N0 for NB-IoT), or indicate a configuration for transport blocks in DL, the item "transmitted data", "data to be transmitted" etc. may refer to data transmitted/to be transmitted in UL, or data received/to be received in DL.

As known by a skilled person in the relevant art, the maximum number of scheduled transport blocks (expressed as NTB_max) for eMTC/NB-IoT UE is configured via RRC signalling or predefined, for example N_TB_max is 8. Also known to one skilled in the art, is that HARQ processes ID corresponding to the transport block is 0-7 can be indicated by 3 bits and the applicable RVs for the transport blocks RV0, RV1, RV2 and RV3 can be indicated by 2 bits. For example, a network equipment/UE performs data transmission with HARQ as a transmitter with respect to a transport block. Particularly, the source bits in the transport block are encoded, for example, with a turbo coder, and then the coded bits are concentrated into a circular buffer with 4 RVs. Coded bits in one of the 4 RVs are selected, scrambled and then modulated to generate transmitted data corresponding to the transport block. In another aspect of the current embodiment, the transport block is assigned with a HARQ process ID. For example, in response to UE/network equipment receiver indicating a NACK for the data transmission with a HARQ process ID, the transmitter may retransmit the data, which is generated from bits in a different RV, with a same or different HARQ process ID. Therefore, the DCI also includes a field for a new data indicator (NDI), which is used to indicate whether the corresponding transport block is transmitted for a first time or retransmitted.

In a Licensed-Assisted Access (LAA) scenario, UE monitors two DCI, one of which is used to schedule one transport block, and the other one is used to schedule multiple transport blocks. In the current design, UE differentiates the two DCI according to the size thereof. Particularly, the DCI used for scheduling multiple transport blocks has different bits from the DCI used for scheduling one transport block. However, in an embodiment disclosed herein, UE differentiates the two DCI with different RNTIs configured by the network equipment. In this way, the DCI used for scheduling multiple transport blocks has the same size as the DCI used for scheduling one transport block, correspondingly UE detect the two DCIs with different RNTIs. It should be noted that, the embodiment where two DCIs are used to indicate the transmission configuration of one transport block and multiple transport blocks, can also be applied to other scenarios, such as eMTC or NB-IoT.

In a eMTC/NB-IoT scenario, the disclosure herein provides a mechanism for scheduling at least one transport blocks with one DCI. As shown in Table 1, which describes fields of a DCI format in more detail, wherein the field for a number of scheduled transport blocks indicates the actual number of transport blocks to be transmitted in the subsequent data channel. As described above, the maximum number of scheduled transport blocks is N_TB_max configured by RRC signalling; that is, at most $\log_2$ N_TB_max bits can be used to indicate an actual number of scheduled transport blocks to be transmitted. For example, in the case that the maximal number of scheduled transport blocks is 8, the actual number of scheduled transport blocks can be 1/2/3/4/5/6/7/8, therefore 3 bits are used to indicate the actual number of scheduled transport blocks. In another example, in the case when the number of scheduled transport blocks by the DCI is limited to be 1, 2, 4, or 8, 2 bits are used to indicate the actual number of schedule transport blocks. For example, 2 bits set to '00' can be used to represent 1 TB, or if set to '01' may represent 2 TBs, or if set to '01' may represent 2 TBs and if set to '11' may represent 3 TBs.

The field for NDI, which is also referred to as the first field herein, indicates whether the scheduled transport blocks are to be transmitted for a first time or retransmitted. That is, the field for NDI indicates whether the transport blocks refer to initial transmission or retransmission. Given that the transmission configuration for most N_TB_max transport blocks can be indicated in the DCI, the number of bits for the first field is N_TB_max, with each bit indicating NDI for each associated transport block.

The field for RV, which is also referred as the second field herein, indicates the RV for each of the transport blocks. Similar with the size of the first field, given that the transmission configuration for most N_TB_max transport blocks can be indicated in the DCI, the number of bits for the second field is 2*N_TB_max, with every 2 bits indicating RV for each associated transport block.

The field for the HARQ process ID, which is also referred as the third field herein, indicates the HARQ process ID for the first scheduled TB. HARQ process IDs for other transport blocks can be derived from HARQ process number of the first scheduled TB. For example, the first transport block is assigned a HARQ process ID of '0', then the second transport block is assigned the HARQ process ID of '1' and so on. In another aspect, the number of bits for the third field is determined by the allowed maximal number of HARQ process. For example, in the case of the uplink transmission in eMTC CE mode A, in which the maximum number of HARQ process is '8', the number of bits for the third field is '3'. In the case of downlink transmission in eMTC CE mode B, in which the maximal number of HARQ process is 2, the number of bits for the third filed is '1'.

TABLE 1

| Field | Number of Bits | Notes |
| --- | --- | --- |
| Number of Scheduled Transport Blocks | log$_2$ N_TB_max | For scheduling 1-N_TB_max TBs |
| HARQ Process ID | 3 | The number of bits is determined by the allowed maximal number of HARQ process. The 3 bits is used in the case of the uplink transmission in eMTC CE mode A. HARQ process ID for the first scheduled TB |
| NDI | N_TB_max | 1bit NDI for each of the TB |
| RV | 2*N_TB_max | 2 bits RV for each of the TB |

Although the embodiment illustrated in Table 1 is able to schedule multiple transport blocks in one DCI, the size of DCI is increased as the value of N_TB_max increases. That is, a number of bits for at least one of the first field for NDI, the second field for RV is determined according to a configured maximum number of scheduled transport blocks. Embodiments illustrated in FIGS. 2-5 can schedule multiple transport blocks in one DCI, meanwhile the size of DCI is controlled in an efficient way.

FIG. 1 is a schematic diagram illustrating scheduling transport blocks with DCI. Particularly, FIG. 1 depicts a correspondence between the DCI format received in DL subframes and data transmitted in UL subframes. As shown in FIG. 1, assuming DCI is received in DL subframe 2, then UE will perform transmission for the first transport block in UL subframe 2+k, wherein 'k' is a time offset which is indicated by DCI or RRC signaling or predefined. In the case of FIG. 1, the time offset is predefined as 4 subframes.

Also, as illustrated in FIG. 1, 4 transport blocks—TB1, TB2, TB3 and TB4, are scheduled in the DCI. The transmission order for the 4 transport blocks is derived by the HARQ process ID of the first transport block. In case the transport block is transmitted by repetition a number of times, especially in the case of eMTC, the next transport blocks will be transmitted following previous transport block being transmitted by repetition a number of times.

In another aspect, although FIG. 1 shows UL grant is indicated with DCI transmitted on the DL channel, scheduling for transport blocks in DL is done in a similar manner except that UE expects to receive multiple transport blocks in a time offset from the DL subframe in which the DCI is received.

In a particular case of TDD UL-DL configuration 0, in which 6 UL subframes and 4 DL subframes (including the special subframe) are configured in a frame, the DCI format for uplink grant (e.g. DCI format 6-0A) includes a field of UL index specified in section 8 of 3GPP 36.213, which is used to indicate one or two subframes scheduled for uplink transmission. Generally, in response to UE receiving a DCI format for uplink grant in subframe #n, UE will transmit the corresponding data in uplink subframe #n+k. With respect to TDD UL-DL configuration '0', if the Most Significant Bit (MSB) of the UL index indicated in the DCI format 6-0A is set to '1', the value of 'k' is determined by a predefined table in 3GPP 36.213 for TDD UL-DL configuration '0'; if the Least Significant Bit (LSB) of the UL index in the DCI format 6-0A is set to '1', the value of 'k' is '7'. In case where both the MSB and LSB of the UL index are set to '1', both of the UL subframes #n+k and #n+7 will be scheduled for data transmission. The HARQ process ID for the transport block scheduled in the UL subframe corresponding to the MSB of the UL index is $n_{HARQ\_ID}$; and the HARQ process ID for the transport block scheduled in the UL subframe corresponding to the LSB of the UL index is "($n_{HARQ\_ID}$+1) mod 7", wherein $n_{HARQ\_ID}$ is determined according to the field for HARQ process ID in the DCI format 6-0A.

Figure 2:
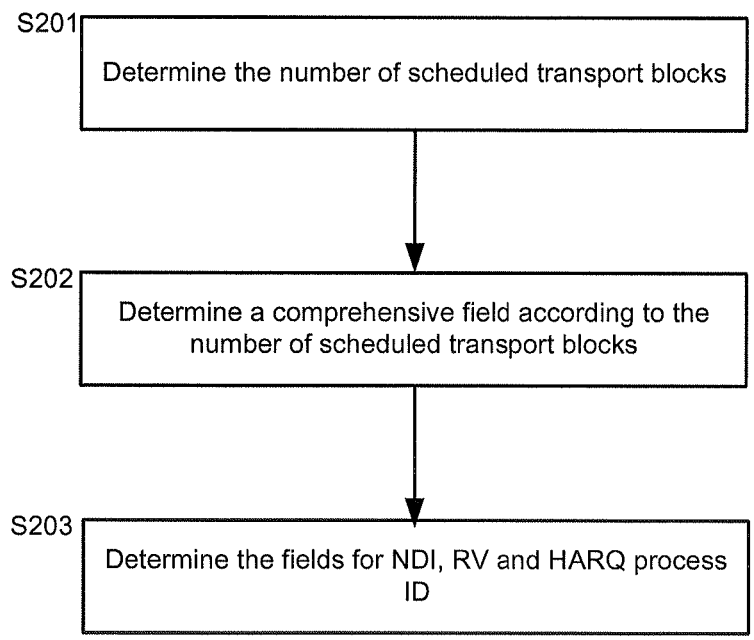
FIG. 2 is a call flow diagram illustrating steps for scheduling multiple transport blocks with DCI according to a first embodiment.

FIG. 2 is a call flow diagram illustrating steps for scheduling multiple transport blocks with DCI according to a first embodiment. In one embodiment, the size of field for NDI and/or RV is determined according to the number of scheduled transport blocks, wherein 1 bit in the field for NDI and/or 2 bits in the field for RV corresponds to one of the multiple transport blocks. Especially, in the case that the number of scheduled transport blocks is more than 2, an increase in the total size of DCI caused by the extra bits for multiple transport blocks in the field for NDI and/or RV, cannot be ignored. Therefore, a fourth field is introduced to indicate comprehensive information indicating at least one of followings: the NDI, the HARQ process ID, and the RV for at least one of the scheduled transport blocks. For example, the fourth field may indicate HARQ process ID and/or NDI for the scheduled transport blocks, determined according to the number of scheduled transport blocks. In that way, the number of bits for the other three fields (NDI, HARQ process ID, and RV) can be reduced. Further, at least one of the three fields may not be present.

In step S201, the network equipment determines the number of scheduled transport blocks N_TB where the number of scheduled transport blocks N_TB is less than or equal to the maximum number of scheduled transport blocks N_TB_max.

In step S202, the network equipment determines a comprehensive field, which is also referred to as a fourth field herein, according to the number of scheduled transport blocks. The fourth field includes information indicating at least one of followings: the NDI, the RV and the HARQ process ID for at least one of the scheduled transport blocks, determined according to the number of scheduled transport blocks In step S203, the network equipment determines the fields for NDI, RV and HARQ process ID. Further, the number of bits for at least one of the fields for NDI, RV and HARQ process ID is determined according to the number of scheduled transport blocks.

In another aspect, UE detects the received DCI in a similar flow shown in FIG. 2. That is, UE firstly determines the number of scheduled transport blocks N_TB in the received DCI, and then, determines the information included in the comprehensive (fourth) field and the number of bits for at least one of the fields for NDI, RV and HARQ process ID according to the number of scheduled transport blocks N_TB.

Table 2 shows details for the fields in DCI for the NB-IoT scenario according to the embodiment illustrated in FIG. 2. UE firstly determines the number of scheduled transport blocks N_TB in the received DCI as "1" or "2" according to the field for the number of scheduled transport blocks, and then determines the information included in the comprehensive (fourth) field. The value of the comprehensive field indicates HARQ process ID or NDI, the detail information in the comprehensive field is determined by the number of scheduled transport blocks. Further, the number of bits for the NDI and RV can be determined as 1 bit and 2 bits respectively, according to the number of scheduled transport blocks.

TABLE 2

| Field | Number of Bits | Notes |
|---|---|---|
| Number of scheduled Transport Blocks | 1 | the value '0' for scheduling 1 TBs<br>the value '1' for scheduling 2 TBs |
| The fourth (comprehensive) field | 1 | If the value of field for the number of the scheduled TBs is "0", the field indicates the HARQ process ID for the first scheduled transport blocks.<br>If the value of field for the number of the scheduled TBs is "1", the field indicates NDI for one of the TBs (e.g. the first TB). |
| The first field | 1 | If the value of field for the number of the scheduled TBs is "0", the field indicates the NDI for the scheduled transport blocks.<br>If the value of field for the number of the scheduled TBs is "1", the field indicates NDI for the other TBs (e.g. the second TB). |
| The second field | 2 | RV for the two TBs |

Figure 3:
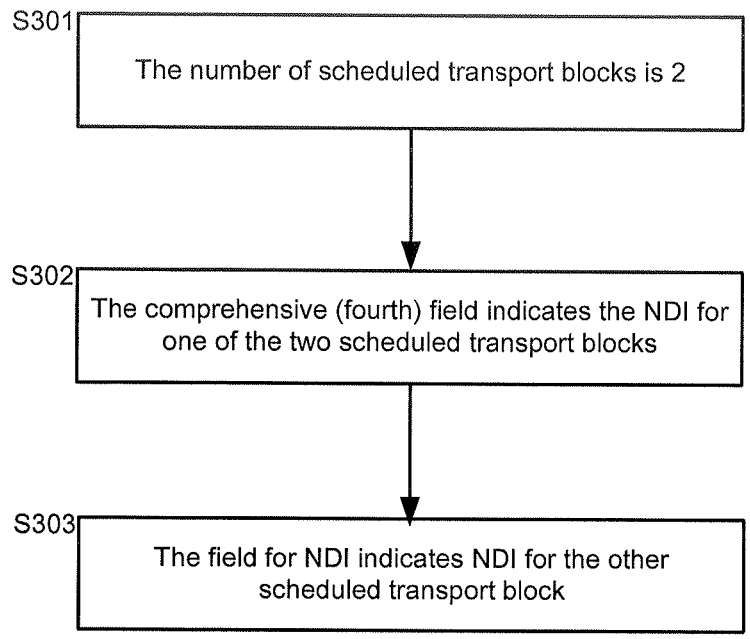
FIG. 3 is a call flow diagram illustrating steps for scheduling multiple transport blocks with DCI according to a second embodiment.

FIG. 3 is a call flow diagram illustrating steps for scheduling multiple transport blocks with DCI according to a second embodiment. FIG. 3 shows a call flow for scheduling two transport blocks with DCI.

For example, in step S301, the network equipment determines the number of scheduled transport blocks is 2.

In step S302 the network equipment determines the comprehensive (fourth) field indicating the NDI for one of the two scheduled transport blocks (e.g. the first scheduled transport block) according to N_TB being 2. The field for HARQ process ID is not present. The HARQ process ID for the first scheduled transport block is a default value known to UE, for example, HARQ process IDs of 0 and 1 are used for the first and second transport block respectively.

In step S303, in the case that the comprehensive (fourth) field is interpreted as NDI for one of the two transport blocks (e.g. the first scheduled transport blocks), the network equipment sets the field for NDI with NDI for the other scheduled transport block (e.g. the second scheduled transport block)

In another aspect, in NB-IoT scenario, the network equipment sets the field for RV with RV for the two scheduled transport block.

Table 3A shows details for the fields in eMTC scenario according to the embodiment illustrated in FIG. 3. Table 3B shows details for the fields in NB-IoT scenario according to the embodiment illustrated in FIG. 3.

TABLE 3A

| Field | Number of Bits | Notes |
|---|---|---|
| Number of scheduled Transport Blocks | 1 | the value '0' for scheduling 1 TBs<br>the value '1' for scheduling 2 TBs |
| a comprehensive (fourth) field | 1 | If the value of field for the number of the scheduled TBs is "0", the field indicates the HARQ process ID for the scheduled transport blocks.<br>If the value of field for the number of the scheduled TBs is "1", the field indicates NDI for one of the TBs (e.g. the first TB). |
| NDI | 1 | If the value of field for the number of the scheduled TBs is "0", the field indicates the NDI for the scheduled transport blocks.<br>If the value of field for the number of the scheduled TBs is "1", the field indicates NDI for the other TBs (e.g. the second TB). |

TABLE 3B

| Field | Number of Bits | Notes |
|---|---|---|
| Number of scheduled Transport Blocks | 1 | the value '0' for scheduling 1 TBs<br>the value '1' for scheduling 2 TBs |
| a comprehensive (fourth) field | 1 | If the value of field for the Number of the scheduled TBs is "0", the field indicates the HARQ process ID for the scheduled transport blocks.<br>If the value of field for the Number of the scheduled TBs is "1", the field indicates NDI for one of the TBs (e.g. the first TB). |
| NDI | 1 | If the value of field for the Number of the scheduled TBs is "0", the field indicates the NDI for the scheduled transport blocks.<br>If the value of field for the Number of the scheduled TBs is "1", the field indicates NDI for the other TBs (e.g. the second TB). |
| RV | 2 | RV for the two TBs |

Particularly, in the case of eMTC CE mode B or NB-IoT, the maximum number of scheduled transports (N_TB_max) is 2, therefore the field for the number of scheduled transport blocks has a size of one bit, wherein '0' indicates scheduling one transport block in DCI and '1' indicates scheduling two transport blocks in DCI.

To be more special, in the case of eMTC CE mode B where the number of scheduled transport blocks is 2:
- The field for HARQ process ID is not present, two default HARQ process IDs (e.g. IDs 0 and 1) known to UE are used for the first and second scheduled transport block, respectively;
- A default RV (e.g. RV0) is used for both of the transport blocks, therefore the field for RV is not present;
- The comprehensive (fourth) field is introduced. The value of the field is interpreted as NDI for one of the two transport blocks (e.g. the first transport blocks). The value of the field for NDI is used as NDI for the other transport block (e.g. the second transport block).

In the case of NB-IoT and the number of scheduled transport blocks is 2:
- The field for HARQ process ID is not present, two default HARQ process IDs (e.g. IDs 0 and 1) known to UE are used for the first and second scheduled transport block respectively;
- Two RVs (e.g. RV0 and RV2) as indicated in the field for RV are used for the first and second transport block;

The comprehensive (fourth) field is introduced. The value of the field is interpreted as NDI for one of the two transport blocks (e.g. the first transport block). Correspondingly, the value in the field for NDI is used as NDI for the other transport block (e.g. the second transport block).

Obviously, in the embodiment illustrated in FIG. 2, the field for HARQ process ID can be regarded as the comprehensive (fourth) field as the value indicated in this field can be interpreted as NDI for one of the scheduled transport blocks, or HARQ process ID for the first schedule transport block. That is, the information included in the fourth field is determined according to the number of scheduled transport blocks.

In another aspect, UE detects the received DCI in a similar flow shown in FIG. 3. That is, UE firstly determines that the number of scheduled transport blocks N_TB is two, and then determines the comprehensive (fourth) field as NDI for one of the two scheduled transport blocks. Further, UE determines that the field for NDI indicates NDI for the other scheduled transport block.

Figure 4:
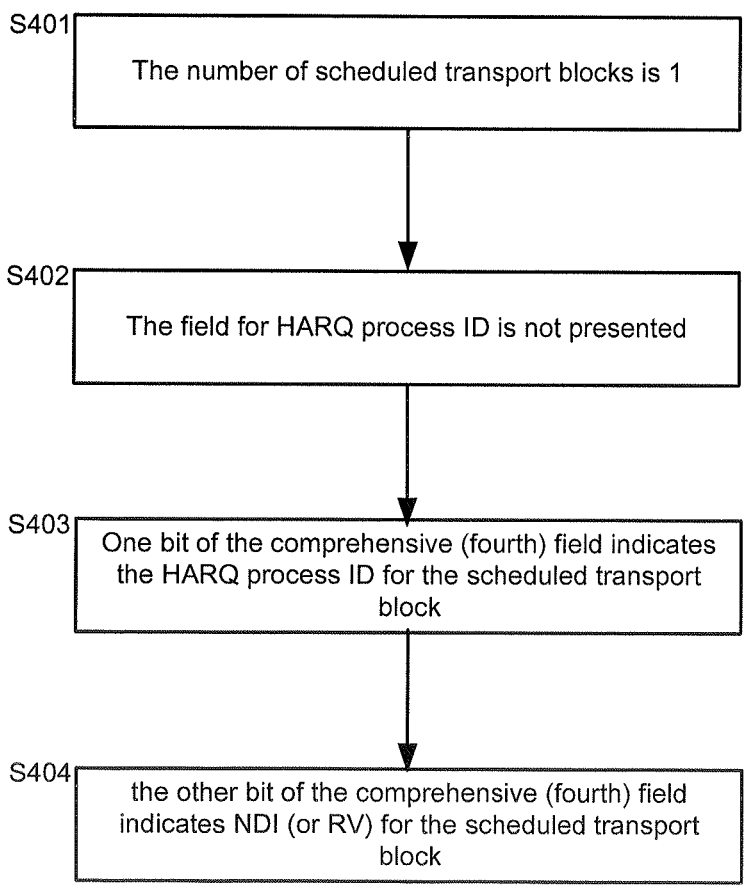
FIG. 4 is a call flow diagram illustrating steps for scheduling multiple transport blocks with DCI according to a third embodiment.

FIG. 4 is a call flow diagram illustrating steps for scheduling multiple transport blocks with DCI according to a third embodiment. FIG. 4 shows a call flow for scheduling one transport block with DCI in the case that one or more transport blocks can be scheduled in the DCI.

In step S401, the network equipment determines the number of scheduled transport blocks is 1.

In step S402, the network equipment determines that the field for HARQ process ID is not present. A default HARQ process ID (e.g. ID 0) known to UE is used for the (first) scheduled transport block.

In step S403 the network equipment determines that one bit of the comprehensive (fourth) field indicates the HARQ process ID for the scheduled transport block.

In step S404 the network equipment determines that the other bit of the comprehensive (fourth) field indicates NDI (or RV) for the scheduled transport block.

Table 4 shows details for the fields according to the embodiment illustrated in FIG. 4.

TABLE 4

| Field | Number of Bits | Notes |
| --- | --- | --- |
| Number of scheduled Transport Blocks | 1 | the value '0' for scheduling 1 TBs<br>the value '1' for scheduling 2 TBs |
| a comprehensive (fourth) field | 2 | If the value of field for the Number of the scheduled TBs is "0", the field indicates the<br>HARQ process ID and NDI for the (first) scheduled transport block.<br>If the value of field for the Number of the scheduled TBs is "0", the field indicates NDI for the two scheduled transport block. |
| RV | 2 | RV for the two TBs |

As described above, the field for the number of scheduled transport blocks has a size of one bit, wherein '0' indicates scheduling one transport block in DCI and '1' indicates scheduling two transport blocks in DCI.

In the case of the maximum number of scheduled transports (N_TB_max) being 2 (e.g. in the case of eMTC CE mode B or NB-IoT), the field for HARQ process ID is not present. One bit of the comprehensive (fourth) filed is interpreted as HARQ process ID for the (first) scheduled transport block, the other bit of the comprehensive (fourth) field is used as NDI (or RV) for the scheduled transport block.

In the case of N_TB being 2, two default HARQ process IDs (e.g. IDs 0 and 1) are used for the first and second scheduled transport block respectively in this case. The two bits in the NDI are used as NDI for the scheduled two transport blocks. The two bits in the RV are used as RV for the scheduled two transport blocks Obviously, in the embodiment illustrated in FIG. 4, the comprehensive (fourth) field can be interpreted as NDI (or RV) for the scheduled transport blocks, and/or HARQ process ID for the first schedule transport block. That is, the information included in the fourth field is determined according to the number of scheduled transport blocks.

In another aspect of present embodiment, UE detects the received DCI in a similar flow shown in FIG. 4. That is, UE firstly determines that the number of scheduled transport blocks N_TB is one, and then determines the field for HARQ process ID is not present. Further, UE determines that one bit in the comprehensive (fourth) field indicates HARQ process ID for the scheduled transport block, and the other bit in the comprehensive (fourth) field indicates NDI (or RV) for the scheduled transport block.

It should be understood that the settings for the comprehensive (fourth) field are not limited to the disclosed ones. In one example, values in the field for RV can be interpreted as NDI for the transport blocks, especially in a case where the same RV is applied to the scheduled transport blocks. In another example, a new field may be introduced to include information indicating at least one of followings: the NDI, the RV and the HARQ process ID for the scheduled transport blocks, while the other three fields (for NDI, RV and HARQ process ID) may not be present.

Figure 5:
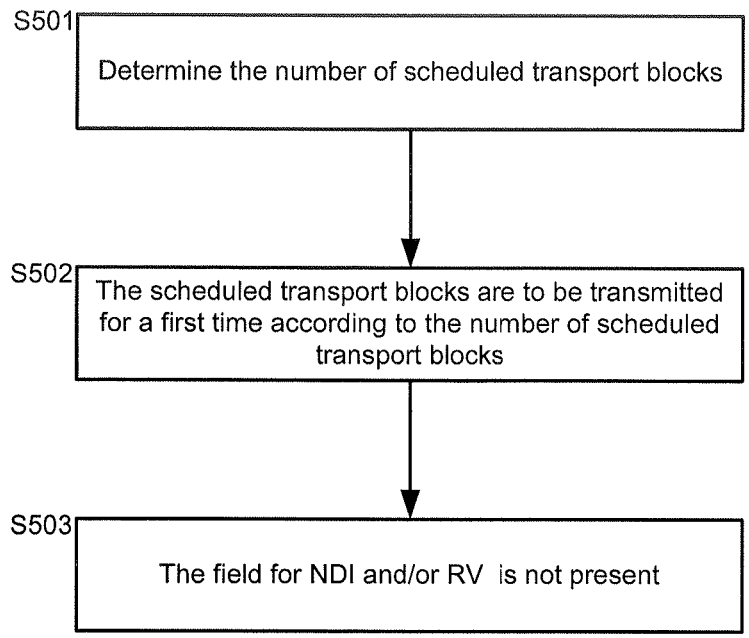
FIG. 5 is a call flow diagram illustrating steps for scheduling multiple transport blocks with DCI according to a fourth embodiment.

FIG. 5 is a call flow illustrating scheduling multiple transport blocks with DCI according to a fourth embodiment.

In step S501, the network equipment determines the number of scheduled transport blocks.

In step S502, the network equipment determines whether the scheduled transport blocks are to be transmitted for a first time according to the number of scheduled transport blocks. That is, the network equipment determines whether the transport blocks refer to initial transmission or retransmission.

In step S503, the network equipment determines that the field for NDI and/or RV need not to be present, given that the scheduled transport blocks are to be transmitted for a first time. Particularly, a default RV value, for example RV0, can be preselected as RV for the scheduled transport blocks in the case of eMTC CE mode A, which is similar with the case of eMTC CE mode B. Therefore, the field for RV need not to be explicitly present. That is, a RV for the scheduled transport blocks is assumed to be a default RV, for example RV0.

Further, DCI may include a field, referred to as a fifth field, to indicate whether the scheduled transport blocks are to be transmitted for a first time. That is, the fifth field indicates whether the transport blocks refer to initial transmission. In another aspect, the fifth field can also indicate whether the schedule transport blocks are the transport blocks to be retransmitted. That is, the fifth field indicates whether the transport blocks refer to retransmission. In this case, the field for NDI and/or RV need not be present either. Particularly, the RV for the retransmitted transport blocks can be derived from the previous RV for the transport blocks.

In one embodiment, the field for NDI with a size of one bit can be used as the fifth field to indicate whether the schedule transport blocks are to be transmitted for a first time.

In another aspect, in response to NACK being indicated for some of the scheduled transport blocks, the network equipment may use a DCI to schedule the transport blocks to be retransmitted. For example, the DCI with fields shown in table 2A/2B/3A/3B can be used in the case that the number of transport blocks to be retransmitted is either one or two.

In another aspect, UE resolves the received DCI in a similar flow shown in FIG. 5. That is, UE firstly determines the number of scheduled transport blocks N_TB, and then determines whether the scheduled transport blocks are to be transmitted for the first time according to the number of scheduled transport blocks.

As described above, one of the eight HARQ processes (HARQ process ID 0-7) can be used for the first scheduled transport blocks. Therefore, the field for HARQ process ID has a size of 3 bits. To reduce the size of the field for HARQ process ID, the value of the field for HARQ process ID is selected from a predefined HARQ process ID set. For example, in the case that the predefined HARQ process ID set is {0,2,4,6}, the HARQ process ID for the first scheduled transport block is HARQ process ID 0, 2, 4, or 6. Given that the HARQ process ID for the first scheduled transport block is limited to a few values, the size of the field for HARQ process ID is reduced. For example, the field for HARQ process ID has a size of two bits in respect to the predefined HARQ process ID set {0,2,4,6}.

In another embodiment, in order to reduce the size of the field for HARQ process ID, the value of the field for HARQ process ID indicates an index of a HARQ process bundle set, which includes multiple HARQ process IDs.

As shown in table 4 which shows an example configuration of HARQ process bundle sets, the size of the field for HARQ process ID is reduced according to the number of scheduled transport blocks.

TABLE 4

| Number of Scheduled TBs | Number of Bits for HARQ Process ID Field | Values for HARQ Process ID field (Index of HARQ process bundle set) | Notes |
| --- | --- | --- | --- |
| 4 | 1 | 0, 1 | Index 0: {0, 1, 2, 3} |
|   |   |   | Index 1: {4, 5, 6, 7} |
| 2 | 2 | 00, 01, 10, 11 | Index 00: {0, 1} |
|   |   |   | Index 01: {2, 3} |
|   |   |   | Index 10: {4, 5} |
|   |   |   | Index 11: {6, 7} |

In the case that the number of scheduled transport blocks is 4, the field for HARQ process ID has a size of one bit. The index of '0' indicates that the HARQ process IDs for the four scheduled transport blocks are HARQ process ID 0, 1, 2, and 3, respectively, while the index of '1' indicates that the HARQ process IDs for the four scheduled transport blocks are HARQ process ID 4, 5, 6, and 7, respectively. In another case where the number of scheduled transport blocks is 2, the field for HARQ process ID will have a size of two bits. The index of '00' indicates that the HARQ process IDs for the two scheduled transport blocks are HARQ process ID 0 and 1, respectively. The index of '01' indicates that the HARQ process IDs for the two scheduled transport blocks are HARQ process ID 2 and 3, respectively. The index of '10' indicates that the HARQ process IDs for the two scheduled transport blocks are HARQ process ID 4 and 5, respectively. The index of '11' indicates that the HARQ process IDs for the two scheduled transport blocks are HARQ process ID 6 and 7, respectively.

It should be understood that the setting for the field for HARQ process ID described above can be applied in combination with other embodiments. For example, with respect to the embodiment illustrated in FIG. 5, the value of the field for HARQ process ID is selected from a predefined HARQ process ID set to limit HARQ process ID for the first scheduled transport blocks. Alternatively, the field for HARQ process ID may indicate an index of a HARQ process bundle set, so that the HARQ process IDs for the scheduled transport blocks are determined according to the indicated HARQ process bundle set.

One skilled in the relevant art will recognize that the process described in FIGS. 2-5 does not need to be practiced in the sequence shown in the Figures, and may be practiced without one or more of the specific steps or with other steps not shown in the Figures.

Figure 6:
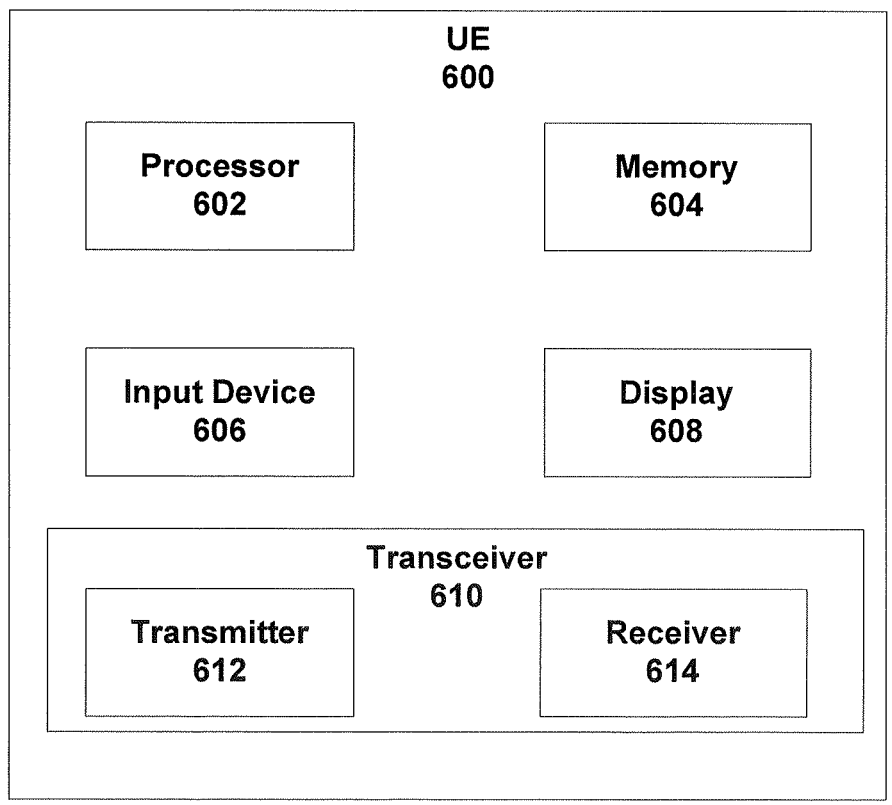
FIG. 6 is a schematic block diagram illustrating components of a UE according to one embodiment.

FIG. 6 is a schematic block diagram illustrating components of a UE such as BL/CE UEs according to one embodiment.

UE 600 is an embodiment of the UE described from FIG. 2 to FIG. 4. Furthermore, UE 600 may include a processor 602, a memory 604, and a transceiver 610. In some embodiments, UE 600 may include an input device 606 and/or a display 608. In certain embodiments, the input device 606 and the display 608 may be combined into a single device, such as a touch screen.

The processor 602, in one embodiment, may include any known controller capable of executing computer-readable instructions and/or capable of performing logical operations. For example, the processor 602 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 602 executes instructions stored in the memory 604 to perform the methods and routines described herein. The processor 602 is communicatively coupled to the memory 604, the input device 606, the display 608, and the transceiver 610.

In some embodiments, the processor 602 controls the transceiver 610 to receive various configuration and data from Network Equipment 700. In certain embodiments, the processor 602 may monitor DL signals received via the transceiver 610 for specific messages.

The memory 604, in one embodiment, is a computer readable storage medium. In some embodiments, the memory 604 includes volatile computer storage media. For example, the memory 604 may include a RAM, including dynamic RAM ("DRAM"), synchronous dynamic RAM ("SDRAM"), and/or static RAM ("SRAM"). In some embodiments, the memory 604 includes non-volatile computer storage media. For example, the memory 604 may include a hard disk drive, a flash memory, or any other suitable non-volatile computer storage device. In some embodiments, the memory 604 includes both volatile and non-volatile computer storage media. In some embodiments, the memory 604 stores data relating to trigger conditions for transmitting the measurement report to Network Equipment 700. In some embodiments, the memory 604 also stores program code and related data, such as an operating system or other controller algorithms operating on UE 600.

UE 600 may optionally include an input device 606. The input device 606, in one embodiment, may include any known computer input device including a touch panel, a button, a keyboard, a stylus, a microphone, or the like. In some embodiments, the input device 606 may be integrated with the display 608, for example, as a touch screen or similar touch-sensitive display. In some embodiments, the input device 606 includes a touch screen such that text may be input using a virtual keyboard displayed on the touch screen and/or by handwriting on the touch screen. In some embodiments, the input device 606 includes two or more different devices, such as a keyboard and a touch panel. In certain embodiments, the input device 606 may include one or more sensors for monitoring an environment of UE 600.

UE 600 may optionally include a display 608. The display 608, in one embodiment, may include any known electronically controllable display or display device. The display 608 may be designed to output visual, audible, and/or haptic signals. In some embodiments, the display 608 includes an electronic display capable of outputting visual data to a user. For example, the display 608 may include, but is not limited to, an LCD display, an LED display, an OLED display, a projector, or a similar display device capable of outputting images, text, or the like to a user. As another, non-limiting, example, the display 608 may include a wearable display such as a smart watch, smart glasses, a heads-up display, or the like. Further, the display 608 may be a component of a smart phone, a personal digital assistant, a television, a table computer, a notebook (laptop) computer, a personal computer, a vehicle dashboard, or the like.

In certain embodiments, the display 608 may include one or more speakers for producing sound. For example, the display 608 may produce an audible alert or notification (e.g., a beep or chime). In some embodiments, the display 608 includes one or more haptic devices for producing vibrations, motion, or other haptic feedback. In some embodiments, all or portions of the display 608 may be integrated with the input device 606. For example, the input device 606 and display 608 may form a touch screen or similar touch-sensitive display. In other embodiments, the display 608 may be located near the input device 606.

The transceiver 610, in one embodiment, is configured to communicate wirelessly with Network Equipment 700. In certain embodiments, the transceiver 610 comprises a transmitter 612 and a receiver 614. The transmitter 612 is used to transmit UL communication signals to Network Equipment 700 and the receiver 614 is used to receive DL communication signals from Network Equipment 900. For example, the transmitter 612 may transmit a HARQ-ACK including feedbacks for one or more DL transmissions. As another example, the receiver 614 may receive various configurations/data from Network Equipment 700.

The transmitter 612 and the receiver 614 may be any suitable types of transmitters and receivers. Although only one transmitter 612 and one receiver 614 are illustrated, the transceiver 610 may have any suitable number of transmitters 612 and receivers 614. For example, in some embodiments, UE 600 includes a plurality of transmitter 612 and receiver 614 pairs for communicating on a plurality of wireless networks and/or radio frequency bands, each transmitter 612 and receiver 614 pair configured to communicate on a different wireless network and/or radio frequency band than the other transmitter 612 and receiver 614 pairs.

Figure 7:
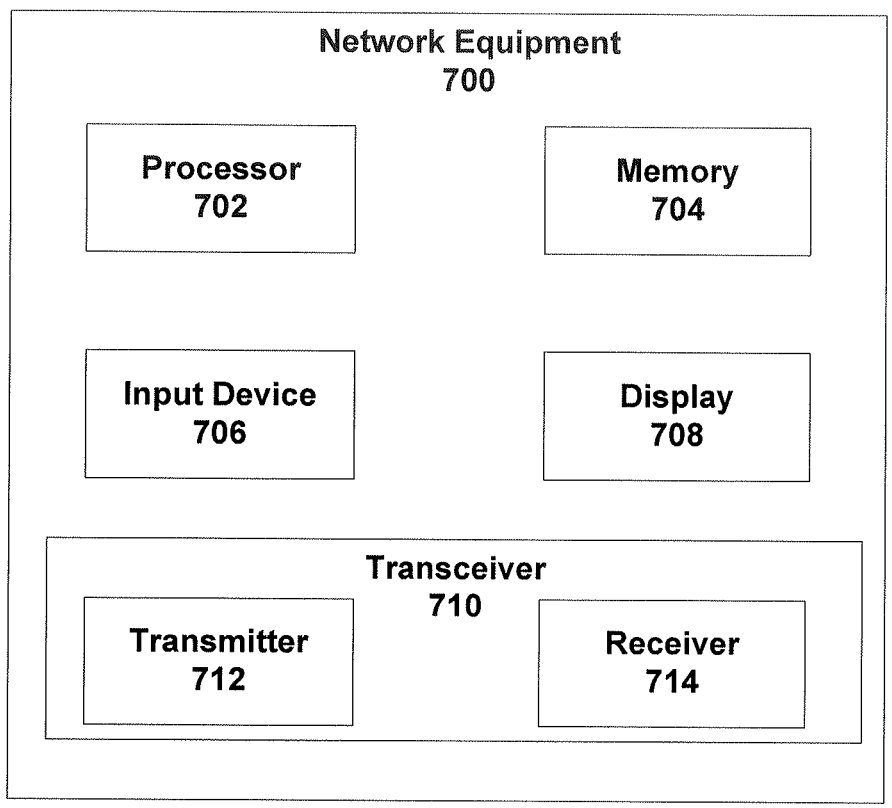
FIG. 7 is a schematic block diagram illustrating components of a network equipment according to one embodiment.

FIG. 7 is a schematic block diagram illustrating components of a network equipment according to one embodiment.

Network Equipment 700 includes one embodiment of eNB/gNB described from FIG. 2 to FIG. 4. Furthermore, Network Equipment 700 may include a processor 702, a memory 704, an input device 706, a display 708, and a transceiver 710. As may be appreciated, the processor 702, the memory 704, the input device 706, and the display 708 may be substantially similar to the processor 702, the memory 704, the input device 706, and the display 708 of UE 600, respectively.

In some embodiments, the processor 702 controls the transceiver 710 to transmit DL signals/data to UE 600. The processor 702 may also control the transceiver 710 to receive UL signals/data from UE 600. For example, the processor 702 may control the transceiver 710 to receive a HARQ-ACK including feedbacks for one or more DL transmissions. In another example, the processor 702 may control the transceiver 710 to transmit a DL signals for various configurations to UE 800, as described above.

The transceiver 710, in one embodiment, is configured to communicate wirelessly with UE 600. In certain embodiments, the transceiver 710 comprises a transmitter 712 and a receiver 714. The transmitter 712 is used to transmit DL communication signals to UE 600 and the receiver 714 is used to receive UL communication signals from UE 600. For example, the receivers 714 may receive a HARQ-ACK codebook from UE 600. As another example, the transmitter 712 may transmit the various configurations/data of Network Equipment 700.

The transceiver 710 may communicate simultaneously with a plurality of UE 600. For example, the transmitter 712 may transmit DL communication signals to UE 600. As another example, the receiver 714 may simultaneously receive UL communication signals from UE 600. The transmitter 712 and the receiver 714 may be any suitable types of transmitters and receivers. Although only one transmitter 712 and one receiver 714 are illustrated, the transceiver 710 may have any suitable number of transmitters 712 and receivers 714. For example, Network Equipment 700 may serve multiple cells and/or cell sectors, wherein the transceiver 710 includes a transmitter 712 and a receiver 714 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
    transmitting a control signal for scheduling at least one transport block;
    wherein the control signal includes one or more fields indicating a new data indication for a first transport block and a redundancy version; and
    wherein the control signal includes:
        a first field indicating a number of scheduled transport blocks; and
        a second field indicating the new data indication for a second transport block or a hybrid automatic repeat request process identifier based at least in part on the number of scheduled transport blocks.

2. The method according to claim 1, wherein a value of the second field indicating a hybrid automatic repeat request process identifier indicates a hybrid automatic repeat request process identifier for the first transport block, which is selected from a predefined hybrid automatic repeat request process identifier set.

3. The method according to claim 1, wherein a value of the second field indicating a hybrid automatic repeat request process identifier indicates an index of a hybrid automatic repeat request process bundle set, which includes multiple hybrid automatic repeat request process identifiers.

4. The method according to claim 1, wherein if the number of scheduled transport blocks is 2:
the hybrid automatic repeat request process identifiers for two scheduled transports blocks are default values.

5. The method according to claim 1, wherein the number of scheduled transport blocks determines whether the scheduled transport blocks are to be transmitted for a first time.

6. The method according to claim 5, wherein a redundancy version for the scheduled transport blocks is a default redundancy version.

7. The method according to claim 5, wherein the control signal further includes a third field for indicating whether the scheduled transport blocks are to be transmitted for a first time.

8. A user equipment (UE), comprising:
at least one memory; and
at least one processor coupled with the at least one memory and configured to cause the UE to:
receive a control signal for scheduling at least one transport block;
wherein the control signal includes one or more fields indicating a new data indication for a first transport block and a redundancy version; and
wherein the control signal includes:
a first field indicating a number of scheduled transport blocks; and
a second field indicating the new data indication for a second transport block or a hybrid automatic repeat request process identifier based at least in part on the number of scheduled transport blocks.

9. The UE according to claim 8, wherein if the number of scheduled transport blocks is 2:
the hybrid automatic repeat request process identifiers for two scheduled transports blocks are default values.

10. A method performed by a user equipment (UE), the method comprising:
receiving a control signal for scheduling at least one transport block;
wherein the control signal includes one or more fields indicating a new data indication for a first transport block and a redundancy version; and
wherein the control signal includes:
a first field indicating a number of scheduled transport blocks; and
a second field indicating the new data indication for a second transport block or a hybrid automatic repeat request process identifier based at least in part on the number of scheduled transport blocks.

11. The method according to claim 10, wherein if the number of scheduled transport blocks is 2:
the hybrid automatic repeat request process identifiers for two scheduled transports blocks are default values.

12. The method according to claim 10, wherein the number of scheduled transport blocks determines whether the scheduled transport blocks are to be transmitted for a first time.

13. The method according to claim 12, wherein a redundancy version for the scheduled transport blocks is a default redundancy version.

14. A base station, comprising:
at least one memory; and
at least one processor coupled with the at least one memory and configured to cause the base station to:
transmit a control signal for scheduling at least one transport block;
wherein the control signal includes one or more fields indicating a new data indication for a first transport block and a redundancy version; and
wherein the control signal includes:
a first field indicating a number of scheduled transport blocks; and
a second field indicating the new data indication for a second transport block or a hybrid automatic repeat request process identifier based at least in part on the number of scheduled transport blocks.

15. The base station according to claim 14, wherein a value of the second field indicating a hybrid automatic repeat request process identifier indicates a hybrid automatic repeat request process identifier for the first transport block, which is selected from a predefined hybrid automatic repeat request process identifier set.

16. The base station according to claim 14, wherein a value of the second field indicating a hybrid automatic repeat request process identifier indicates an index of a hybrid automatic repeat request process bundle set, which includes multiple hybrid automatic repeat request process identifiers.

17. The base station according to claim 14, wherein if the number of scheduled transport blocks is 2:
the hybrid automatic repeat request process identifiers for two scheduled transports blocks are default values.

18. The base station according to claim 14, wherein the number of scheduled transport blocks determines whether the scheduled transport blocks are to be transmitted for a first time.

19. The base station according to claim 18, wherein a redundancy version for the scheduled transport blocks is a default redundancy version.

20. The base station according to claim 18, wherein the control signal further includes a third field for indicating whether the scheduled transport blocks are to be transmitted for a first time.

* * * * *